(12) United States Patent
Pritchard et al.

(10) Patent No.: US 8,342,051 B2
(45) Date of Patent: Jan. 1, 2013

(54) DCT TRANSMISSION UTILIZING A TWO AXIS CHAIN

(75) Inventors: Larry A. Pritchard, Macomb, MI (US); Matthew Rahaim, Royal Oak, MI (US); R. Keith Martin, Marlette, MI (US)

(73) Assignee: BorgWarner Inc., Auburn Hills, MI (US)

( * ) Notice: Subject to any disclaimer, the term of this patent is extended or adjusted under 35 U.S.C. 154(b) by 143 days.

(21) Appl. No.: 12/803,499

(22) Filed: Jun. 29, 2010

(65) Prior Publication Data

US 2010/0331132 A1 Dec. 30, 2010

Related U.S. Application Data

(60) Provisional application No. 61/269,781, filed on Jun. 29, 2009.

(51) Int. Cl.
*F16H 3/08* (2006.01)
(52) U.S. Cl. .......................................................... 74/331
(58) Field of Classification Search .............. 74/330, 74/331, 333, 339, 340, 665 L, 665 G
See application file for complete search history.

(56) References Cited

U.S. PATENT DOCUMENTS

| | | | |
|---|---|---|---|
| 4,566,348 A * | 1/1986 | Akashi et al. ................... 74/359 |
| 5,711,409 A | 1/1998 | Murata |
| 6,314,928 B1 | 11/2001 | Baraszu et al. |
| 6,318,318 B1 | 11/2001 | Jahr |
| 6,532,920 B1 | 3/2003 | Sweetnam et al. |
| 6,553,962 B1 | 4/2003 | Russ et al. |
| 6,631,700 B2 | 10/2003 | Diggs et al. |
| 6,634,247 B2 * | 10/2003 | Pels et al. ........................ 74/329 |
| 6,729,284 B2 | 5/2004 | Lunsford |
| 6,782,856 B2 | 8/2004 | Aimone |
| 6,871,620 B2 | 3/2005 | Aimone |
| 6,887,184 B2 | 5/2005 | Buchanan et al. |
| 6,909,955 B2 | 6/2005 | Vukovich et al. |
| 6,966,989 B2 | 11/2005 | Hojsgaard et al. |
| 7,121,162 B2 * | 10/2006 | Hatakeyama et al. .......... 74/360 |
| 7,150,698 B2 * | 12/2006 | Sakamoto et al. ................ 477/5 |
| 7,367,917 B2 * | 5/2008 | Sakamoto et al. ................ 477/5 |
| 7,367,919 B2 * | 5/2008 | Fahland et al. ................. 477/79 |
| 7,896,770 B2 * | 3/2011 | Earhart et al. ............... 475/218 |
| 2002/0033059 A1 * | 3/2002 | Pels et al. ........................ 74/329 |
| 2002/0092372 A1 * | 7/2002 | Bowen ............................ 74/339 |
| 2005/0211007 A1 | 9/2005 | Suzuki et al. |
| 2006/0101933 A1 | 5/2006 | Koenig et al. |
| 2006/0207655 A1 | 9/2006 | Xiang et al. |
| 2006/0219034 A1 | 10/2006 | Hori et al. |
| 2007/0068297 A1 | 3/2007 | Hori et al. |
| 2007/0144284 A1 | 6/2007 | Mitsubori et al. |
| 2007/0277634 A1 * | 12/2007 | Komori ........................... 74/331 |
| 2008/0064554 A1 | 3/2008 | Tsukada et al. |
| 2008/0087119 A1 | 4/2008 | Shiozaki |

(Continued)

*Primary Examiner* — Ha D. Ho
*Assistant Examiner* — Jude Agendia
(74) *Attorney, Agent, or Firm* — Warn Partners, P.C.

(57) ABSTRACT

A vehicle dual clutch transmission is provided which includes a first clutch housing driven along a first axis extending generally aligned with the output axis of an engine. A second clutch housing is provided which is chain driven from the first clutch housing and extends along a second generally parallel axis. First and second input shafts are respectively driven by the first and second clutches. An output shaft or shafts is provided that is driven by the input shafts and has selective meshed torsional force transferring gear contact therewith. A differential input gear is driven by the output shaft(s).

13 Claims, 5 Drawing Sheets

U.S. PATENT DOCUMENTS

2008/0163710 A1* 7/2008 Antonov .................. 74/331
2009/0100952 A1* 4/2009 Tsuji et al. ................ 74/335
2009/0137358 A1* 5/2009 Braford .................. 475/271
2011/0030493 A1* 2/2011 Koenig et al. ............ 74/473.11
2011/0203409 A1* 8/2011 Nishida et al. ............ 74/665 A

* cited by examiner

DCT TRANSMISSION UTILIZING A TWO AXIS CHAIN

FIELD OF THE INVENTION

The present invention relates to dual clutch transmissions for automotive vehicles.

BACKGROUND OF THE INVENTION

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first and oldest type is the manually operated transmission. These transmissions include a foot-operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever, and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. A type of combination type transmission is commonly referred to as a dual clutch transmission.

Examples of dual clutch transmissions and control methods can be found by a review of U.S. Patents and Patent Application Publications U.S. Pat. Nos. 5,711,409; 6,966,989; 6,887,184; 6,909,955; Patent Application Publications 2006/0101933A1; and 2006/0207655A1 commonly assigned.

Dual clutch transmissions can be utilized in front wheel drive engines. When utilizing a dual clutch transmission in a transverse mounted engine, it is desirable to make the width of the transmission as short as possible. An example of a dual clutch transmission for a front wheel drive vehicle is shown in Patent Application PCT/US2008/004288. It is desirable to provide a dual clutch transmission suitable for a transverse mounted front wheel drive vehicle or other vehicle which is axially shorter than that described in Patent Application PCT/US2008/004288.

SUMMARY OF THE INVENTION

To meet the above noted and other desires, a revelation of the present invention is brought forth.

In a preferred embodiment, the present invention brings forth a vehicle dual clutch transmission which includes a first clutch housing driven along a first axis extending generally aligned with the output axis of an engine. A second clutch housing is provided which is chain driven from the first clutch housing and extends along a second generally parallel axis. First and second input shafts are respectively driven by the first and second clutches. An output shaft or shafts is provided that is driven by the input shafts and has selective meshed torsional force transferring gear contact therewith. A differential input gear is driven by the output shafts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention. Figs.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
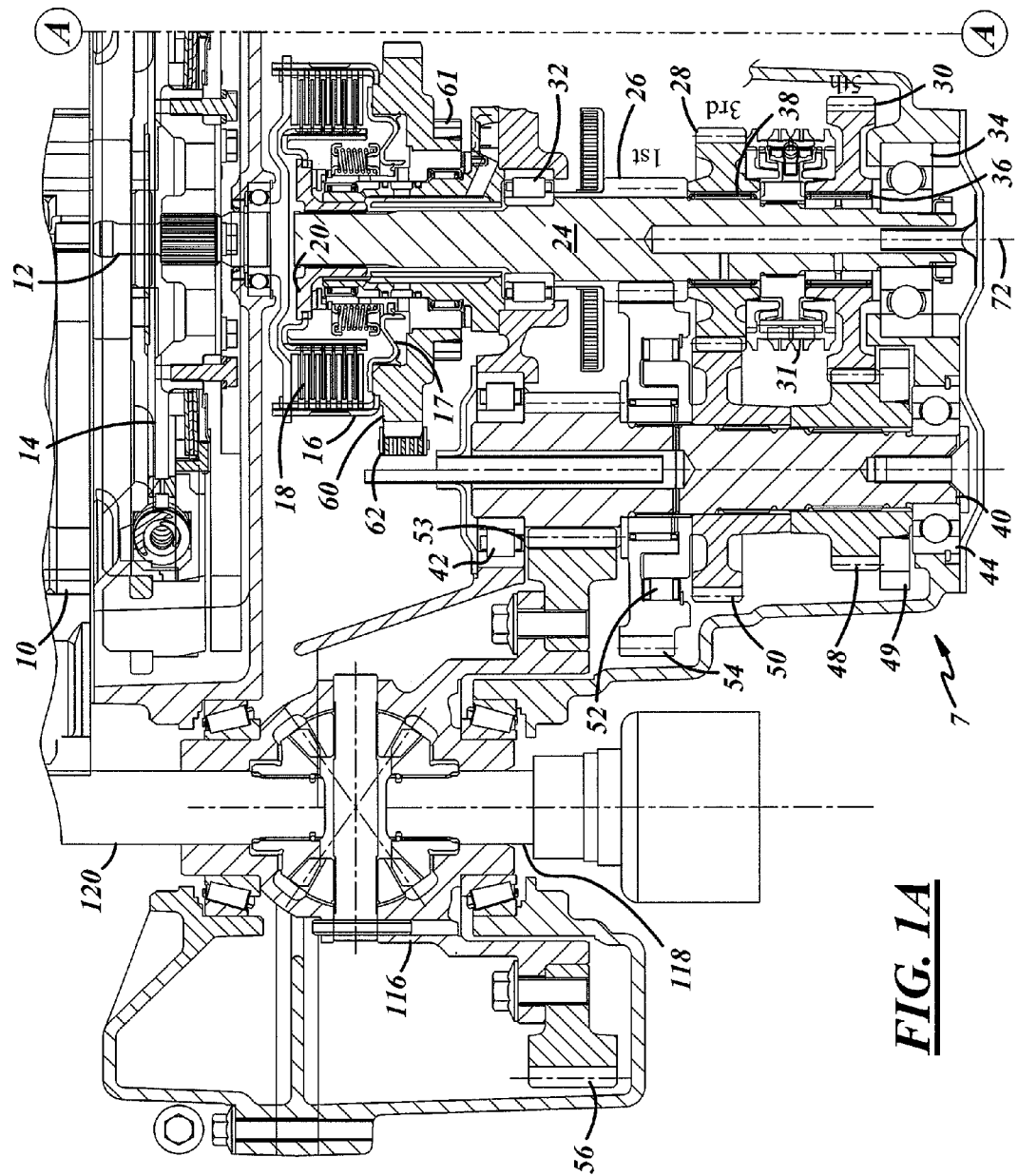
FIGS. 1A and 1B are sectional laid out views of a six speed version vehicle dual clutch transmission according to the present invention.
Figure 1B:
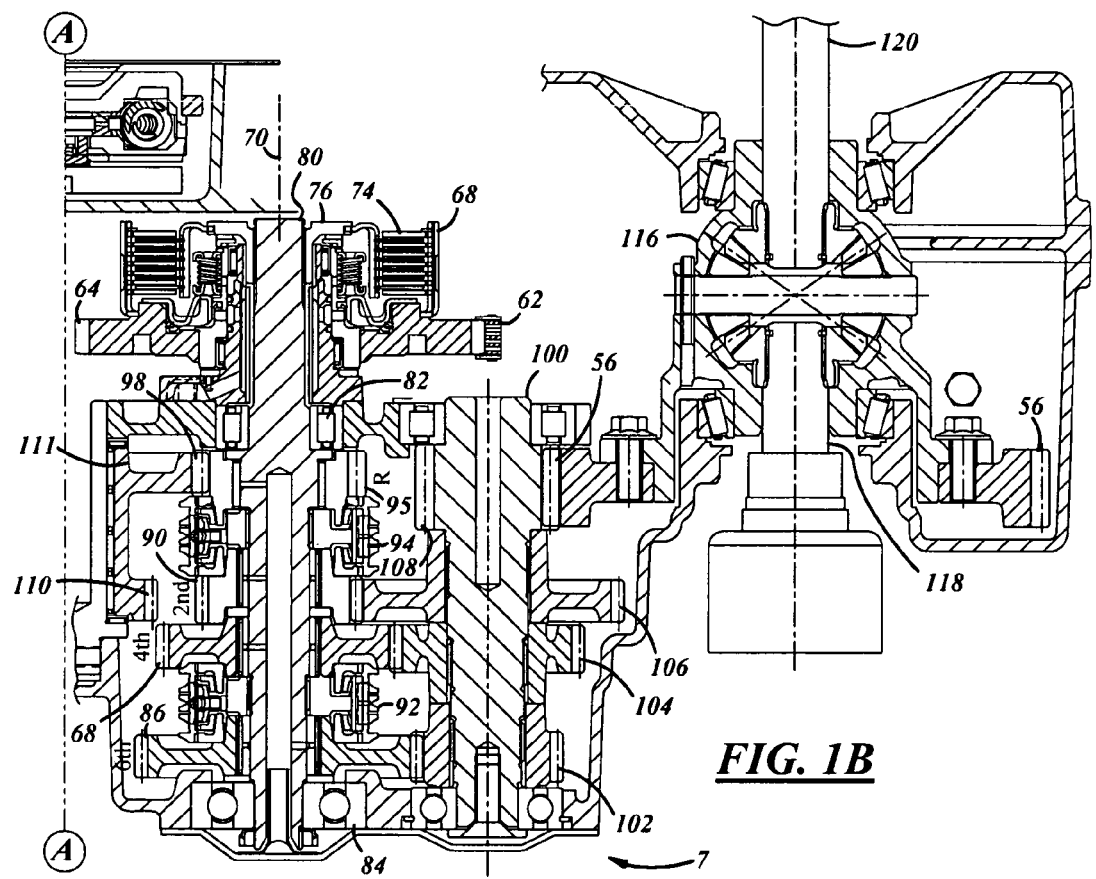
Figure 2:
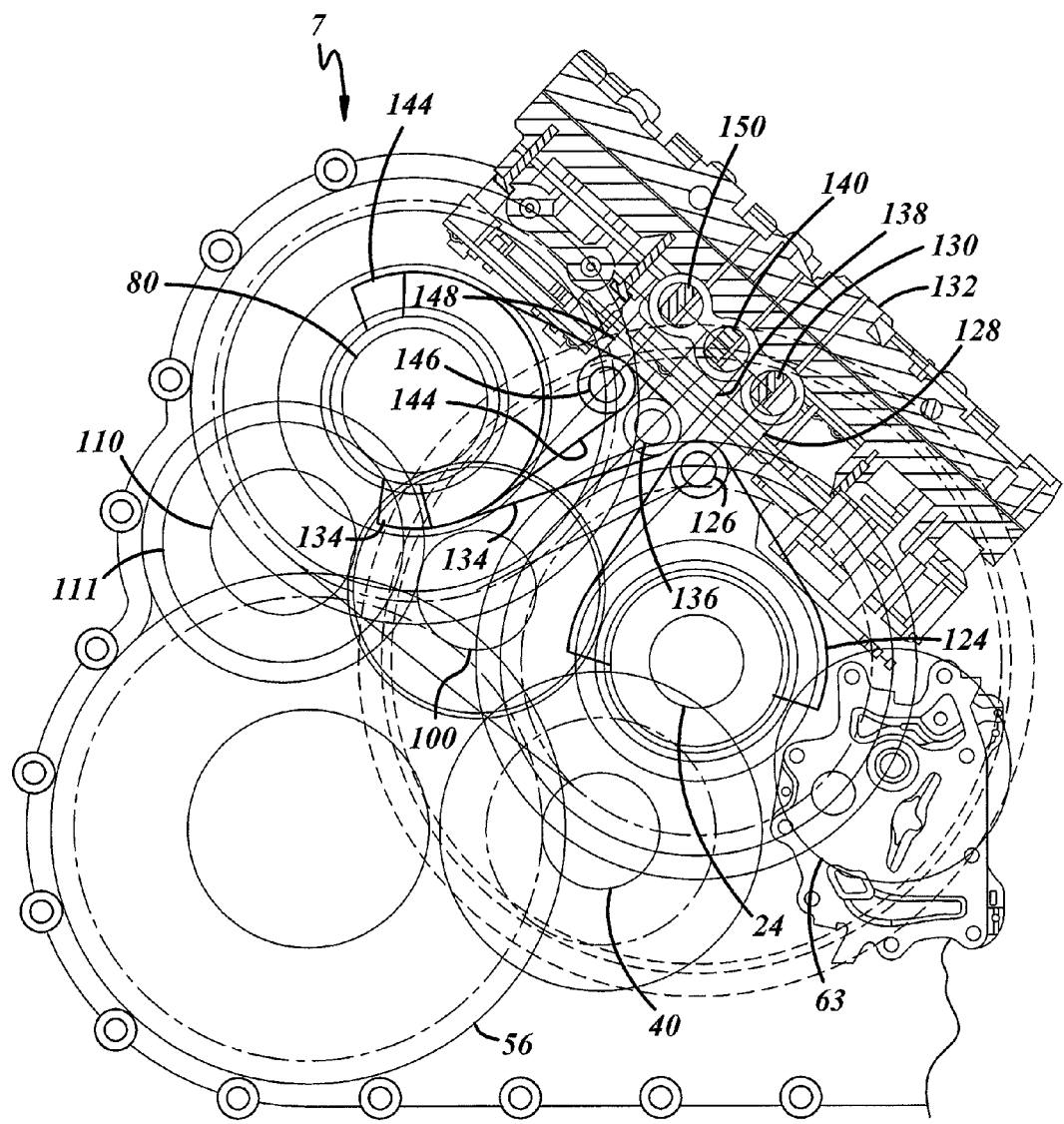
FIG. 2 is a front schematic view partially sectioned of the transmission shown in FIGS. 1A and 1B looking from the vehicle engine towards the transmission.

Referring to FIGS. 1 and 2, a transverse mounted engine 10 for a front wheel drive vehicle powers a six speed dual clutch transmission 7 of the present invention. The engine 10 has an output shaft 12. The output shaft 12 is torsionally connected with a damper 14. The damper 14 is torsionally connected with a first clutch housing 16. Clutch housing 16 is operatively associated with a first clutch friction pack 18. Friction pack 18 is actuated by a clutch piston 17. Friction pack 18 is operatively associated with a hub 20. The hub 20 is torsionally connected with a first input shaft 24. First input shaft 24 provides the odd gear ratios for the transmission 7. First input shaft 24 mounts an integral or fixably connected first gear 26, a third gear 28 and a fifth gear 30. A fifth/third synchronizer 31 is provided to selectively torsionally engage the gears 30 or 28 to the shaft 24. A mid-portion of the first input shaft 24 is rotatably mounted by a bearing 32 and a rearward end by a bearing 34. Fifth gear and third gear 30 and 28 are both rotatably mounted on needle bearings 36 and 38 respectively.

Selectively meshing in a torsional force transferring manner with the gears of the input shaft 24 is first output shaft 40. First output shaft 40 is mounted by a front bearing 42 and a rear bearing 44. The first output shaft 40 has a gear 48 for meshing with the fifth gear 30, and a gear 50 for meshing with the third gear 28. Both gears 48 and 50 are spline connected to the first output shaft 40. The first output shaft 40 also mounts a one way clutch 52. A parking gear 49 used for the parking function is connected with the gear 48. In an alternative embodiment, not shown, the parking gear is placed within the differential. The one way clutch 52 mounts a gear 54 to mesh with first gear 26 to provide the first gear ratio. The first output shaft 40 has an integrally formed output pinion 53 to drive a differential ring input gear 56.

The clutch housing 16 is also fixably engaged with a first sprocket 60. The sprocket 60 also has attached a hydraulic pump gear 61 that drives a hydraulic pump 63. To conserve axial space, sprocket 60 axially overlappingly extends over the clutch piston 17. The sprocket 60 drives a chain 62. Chain 62 drives a second sprocket 64 (FIG. 1B). Sprocket 64 has a larger diameter than the sprocket 60. Sprocket 64 is fixably connected with a second clutch housing 68. Clutch housing 68 rotates on a second axis 70 which is parallel with an axis 72 that the first clutch housing 16 and the engine output shaft 12 rotate about. A second clutch friction pack 74 is also operatively associated with the second clutch housing 68. Second friction pack 74 is operatively associated with a hub 76 which powers a second input shaft 80. The second input shaft 80 is rotatably mounted by front bearing 82 and a rear bearing 84. Rotatably mounted on the second input shaft 80 on needle bearings are sixth gear 86, fourth gear 88 and second gear 90. To selectively torsionally connect the gears, 86, 88 and 90 to the shaft a six/four synchronizer 92 and a second/reverse synchronizer 94 are provided. A needle bearing mounted reverse (synchronizable to rotate with second input shaft 80) driving gear 95 meshes with an idler shaft reverse driven gear 98.

To mesh with the gears of the second input shaft 80 in a torsional force transferring manner, there is a second output shaft 100. The second output shaft 100 has spline connected gears 102, 104 and 106 to selectively torsional force transferring manner mesh with sixth, fourth and second gears 86, 88 and 90 respectively. The gear 106, when the transmission 7 is placed in reverse, meshes with reverse idler shaft driving gear 110 to provide the reverse gear function. Reverse idler shaft driving gear 110 and reverse idler shaft driven gear 98 are both fixably connected on reverse idler shaft 111. A pinion (final drive) gear 108 meshes with the ring gear 56 (shown in both FIGS. 1A and 1B) of differential 116 which in turn powers front wheel drive shafts 118 and 120.

In operation, transmission 7 is powered from the output shaft 12 of the engine 10. Rotation of the engine output shaft 12 causes rotation of the damper 14 which dampens torsional vibrations provided by the reciprocating piston nature of the engine 10. The damper 14 rotates clutch housing 16 and sprocket 60. The sprocket housing 60 drives chain 62 which drives the larger sprocket 64 associated with the second clutch housing 68. The friction pack 18 is engaged by clutch piston 17 therefore torsionally connecting the first clutch housing 16 with the hub 20 and the first input shaft 24. A first gear is provided by gear 26. Gear 26 engages a corresponding gear 54 of the first output shaft 40 (via one way clutch 52). While the above is happening, according to parameters of the electronic controller (not shown), the friction pack 74 is disengaged and the synchronizer 94 is actuated leftward as shown in FIG. 1 to torsionally connect the second gear 90 with the second input shaft 80. When the controller signals for the transmission to engage in second gear, the friction pack 18 is released and the friction pack 74 is engaged. The transmission 7 is now in second gear. The above noted sequence of operation is commonly referred to as a pre-selecting sequence. In a non pre-selecting sequence, the second synchronizer 96 does not connect the second gear 90 to the second output shaft 80 until friction pack 18 is released. Although the remainder of the operation of the transmission 7 is described in a pre-selection mode, it is apparent to those skilled in the art that a combination of both pre-selection and non pre-selection modes can be utilized. After the shift is complete to second gear, to prepare for the shift to third gear, synchronizer 94 is brought to a neutral position allowing the second gear 90 to be torsionally disengaged from the second input shaft 80. Simultaneously, synchronizer 31 is moved rightward engaging third gear 28 with the first input shaft 24. This movement is primarily completed while the friction pack 18 is disengaged. Upon re-engagement of the clutch pack 18, to connect the hub 20 with the clutch housing 16, the rotation of the first input shaft 24 moves third gear 28. Third gear 28 now has torsional force transferring mesh contact with first output shaft 50 which in turn causes pinion 53 to rotate differential gear. To disengage the third gear 28, the fifth/third synchronizer 40 is moved leftward simultaneously the friction pack 74 is engaged and synchronizer 92 is engaging fourth gear 88 with second input shaft 80. As mentioned previously, to switch to the fifth gear 130, the friction pack 74 is disengaged. The friction pack 18 is engaged turning the first input shaft 24 and rotating the fifth gear 50. The fifth gear 50 meshes with gear 48 of the first output shaft which in turn turns the ring gear 56 powering front wheel drive axles 118 and 120 through the differential 116. For a switch to the sixth gear, synchronizer 92 is moved leftward engaging gear 86 with the second input shaft 80 while the friction pack 18 is disengaged. Synchronizer 31 is moved rightward disengaging the fifth gear 30 from the first input shaft 24. After engagement with the shaft 80 and upon engagement of the friction pack 74, sixth gear 86 has torsional force transferring mesh contact with gear 102 of the second output shaft 100. Second output shaft 100 pinion gear 108 torsionally meshes with input gear 56 of the differential 116.

The sprocket 64 on the even gear input shaft 80 is larger so that the reverse gear 95 can be larger on the even input shaft 80 with second reverse synchronizer 94. The size of the reverse gear 95 does not get too small, therefore the gear ratio for reverse gear 95 can be larger for packaging considerations. Another advantage of transmission 7 design is that it has only two input axes 72 and 70. Therefore, the chain 62 does not need as many tensioners to ensure the maximum amount of torsional input for each sprocket. There is less chance of chain jump and also better torsional force transferring efficiency.

By using a reverse idler driving gear 110 that reaches back to the second output gear 106 for reverse hook-up, there is a reduction in the length of the input shaft 80 in the axial direction. The above allows placement of the input shaft reverse driving gear 95 in the same axially bisecting transverse plane as the final drive gear mesh between the second output shaft pinion 108 and the differential input gear 56. Normally, transmissions are not able to utilize the radial space on the input shaft 80 in the same axially bisecting transverse plane across from the final drive pinion (because the final drive pinion is in the way of the output gear in such a position), but since with the present design of the transmission 7, the reverse idler shaft driving gear 110 inputs into the second output gear 106, transmission 7 is able to put input shaft reverse driving gear 95 in the shown axial position.

The step reverse idler shaft reverse gears 98, 110 also provides opportunity increase the gear ratio which to make it generally equal to the first gear ratio is important for launch in reverse.

Another advantage of the present invention is that all of the synchronizers 31, 92 and 94 are on the input shafts 24, 80 and therefore avoids a need for large diameter or multi-cone synchronizers on the output shafts (to handle a larger rotational inertia of both the input and output shaft) 40 and 100 can be avoided.

FIG. 2 is a view, as mentioned previously, of transmission 7 looking from the engine 10. The view of FIG. 2 is a view from right to left in FIGS. 1A and 1B. Referring to FIG. 2 in particular, a shift fork 124 is slidably or axially mounted on a rail 126. The shift fork 124 is used to control movement of the fifth/third synchronizer 31. The shift fork is connected with a bracket 128. Bracket 128 is connected with a piston 130. The piston 130 has its extreme end slidably mounted within opposing cylinders (not shown). The opposing cylinders can be filled or evacuated by hydraulic solenoids (not shown) control by an electronic transmission control module (not shown). These solenoids attach to a valve body 132. Another shift fork 134 is slides on a rail 136 and is connected with a bracket 138. Bracket 138 is connected with a piston 140 which has its opposing ends slidably mounted within opposing cylinders. Fluid lines within the valve block 132 are filled or relieved to control the movement of the shift fork 134. Another shift fork 144 is mounted on a rail 146 and is connected with a bracket 148 which is connected with a piston 150. Shift fork 144 is provided for controlling sixth/fourth synchronizer 92 and shift fork 134 is provided for controlling synchronizer 94. Advantage of the inventive transmission 7 is that the valve block 132 bridges over a valley between the first and second input shafts 24 and 80 and additionally, the shift rails 146, 136 and 126 are all positioned within the valley adding to the compactness of the design of the transmission 7.

Figure 3A:
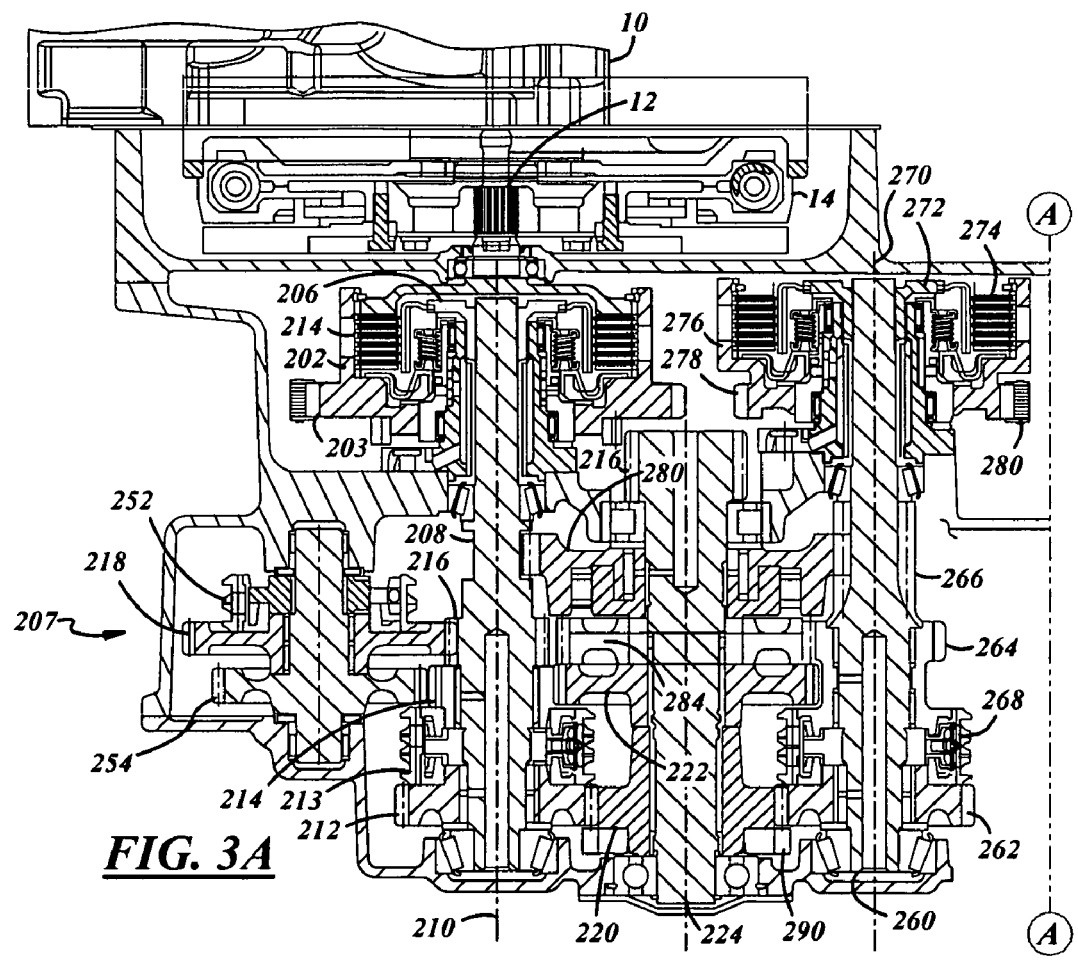
FIGS. 3A and 3B are sectional views similar to that of 1A and 1B of a five speed version of a vehicle dual clutch transmission according to the present invention.
Figure 3B:
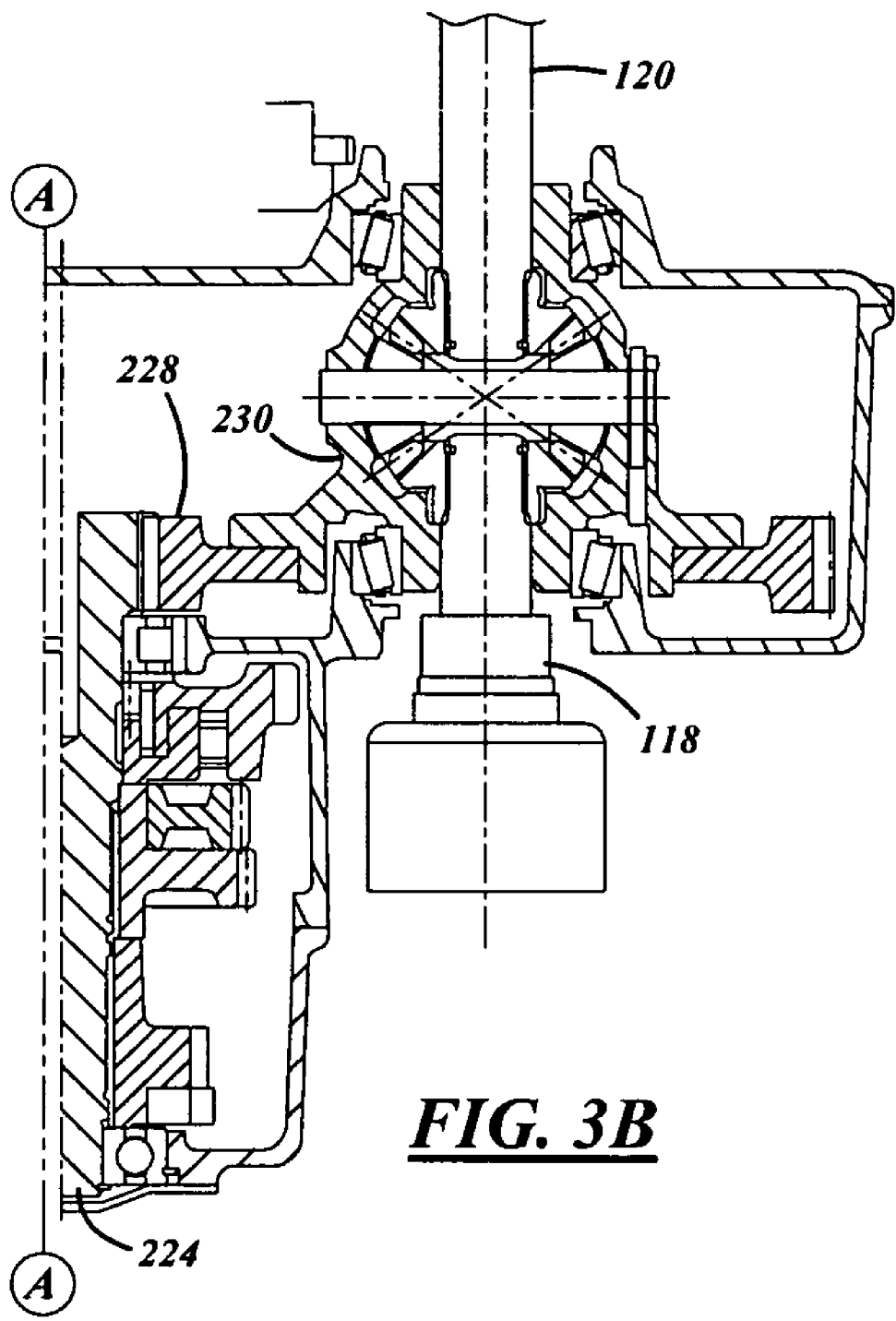

Referring to FIGS. 3A and 3B five speed transmission 207 according to the present invention is shown. Its operation is substantially similar to the six speed transmission 7 previously described. The five speed transmission 207 has a damper 14 connected with the output shaft 12 of an engine 10. The damper 14 is connected with a clutch housing 202 which is operatively associated with a first friction pack 214 which when engaged torsionally connects the first clutch housing 202 with a hub 206 that powers a first input shaft 208. First input shaft 208 that is on a common axis 210 with the engine output shaft 10 carries fourth and second gears 212 and 214 respectively. A reverse driving gear 216 is also provided which meshes with an idler shaft driven reverse gear 218. Fourth gear 212 and second gear 214 mesh with gears 220 and 222 that are affixed with the output shaft 224. Gears 212 and 214 are synchronized by fourth/second synchronizer 213. Output shaft 224 has a geared section 226 which engages with a ring gear 228 of a differential 230 powering front axle 118 and 120.

Transmission 207 has an odd input shaft 260 which carries fifth gear 262, third gear 264 and first gear 266. The fifth and third gears 262 and 264 are synchronized by fifth/third synchronizer 268. The shaft 260 rotates on an axis 270 generally parallel with axis 210 and is driven by a hub 272 operatively associated with a second clutch housing friction pack 274 which in turn is operatively associated with a second clutch housing 276 which is affixed with a sprocket 278 driven by chain 280 which is in turn driven by the first sprocket 203. The configuration of transmission 207 has both of the output shafts 208 and 260 being selectively torsionally engaged with a common output shaft 224. The first gear 266 is operatively associated with a one way clutch 280 which is connected with the output shaft 224. To engage with a third gear 264, the output shaft has a gear 284. Output shaft gear 220 engages fifth input gear 262. The output shaft 224 also has a gear 290 which is used to engage the transmission 7 in park.

The operation of transmission 207 is essentially similar to that of transmission 7 with the exception that there are only five forward gear ratios and that the even input shaft is aligned with the axis of the engine output shaft 12. Additionally, the reverse idler shaft driving gear 218 can be selectively joined on idler shaft 250 by a synchronizer 252. An idler shaft reverse driving gear 254 meshes with the second output gear 222 provided on the output shaft 224. Again, the differences of diameter of the gears 218 and 254 increases the gear ratio allowing reverse gear to have high torque capabilities similar to that of the first gear.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A dual clutch transmission for a vehicle comprising:
    a first clutch housing driven by an engine extending along a first axis generally aligned with an output axis of said engine;
    a chain driven by said first clutch housing;
    a second clutch housing driven by said chain extending along a second axis generally parallel spaced from said first axis;
    a first input shaft driven by said first clutch;
    a second input shaft driven by said second clutch;
    output shaft(s) driven by said input shafts having selective meshed torsional force transferring gear contact therewith;
    a differential input gear driven by said output shaft(s); and
    wherein said chain axially overlappingly extends over a clutch piston of at least one of said first and second clutch housings.

2. A dual clutch transmission as described in claim 1 wherein there is a separate output shaft for each input shaft.

3. A dual clutch transmission as described in claim 2 wherein there are six forward gear ratios and one reverse gear ratio and wherein odd gear ratios are operatively associated with said first input shaft.

4. A dual clutch transmission as described in claim 1 wherein the chain driving the second clutch housing axially overlappingly extends over a clutch piston of said first clutch housing.

5. A dual transmission as described in claim 1 having a parking gear.

6. A dual clutch transmission as described in claim 1 having shift rails and wherein all of said shift rails are positioned in a valley juxtaposing said first and second input shafts.

7. A dual clutch transmission as described in claim 1 wherein there is an idler shaft to provide a reverse gear ratio and wherein said idler shaft has positioned thereon a synchronized gear for selective torsional force transferring meshed engagement with a gear of one of said input shafts.

8. A dual clutch transmission as described in claim 1 wherein a valve block extends over a valley between said first and second input gears.

9. A dual clutch transmission as described in claim 1 wherein a first gear and a reverse gear have the same gear ratio.

10. A dual clutch transmission as described in claim 1 wherein there are six forward gear ratios and one reverse gear ratio and wherein the reverse gear ratio is operatively associated with said second input shaft that even gear ratios are associated with and wherein a reverse drive gear is in a common axial bisecting plane of a final drive pinion and wherein said reverse drive gear is synchronized to rotate with said second input shaft when said transmission is in reverse gear.

11. A dual clutch transmission as described in claim 1 wherein a reverse idler gear is engaged with a second output gear of said output shaft and wherein said idler gear increases the gear ratio.

12. A vehicle dual clutch transmission comprising:
    a first clutch housing driven along an engine along a first axis extending generally aligned with an output axis of said engine;
    a chain driven by said first clutch housing;
    a second clutch housing driven by said chain extending along a second axis generally parallel spaced from said first axis, and wherein said chain axially overlappingly extends over a clutch piston of said first clutch housing;
    a first input shaft driven by said first clutch having first, third and fifth gears operatively associated therewith;
    a second input shaft driven by said second clutch having second, fourth and sixth gears associated therewith;
    first and second output shafts driven by said respective first and second input shafts having selective meshed torsional force transferring gear contact therewith; and
    an output gear for torsional connection with a differential driven by said output shafts and wherein said second input shaft has a selectively engageable reverse drive gear pinion which is synchronized to rotate with said second input shaft when said transmission is in reverse gear and wherein said reverse drive gear is in a common axial bisecting plane of a final drive pinion providing said output gear for torsional connection of said differential driven by said output shafts and wherein said reverse drive gear is engaged with a reverse idling gear having a reverse output gear providing an increase gear ratio and wherein said reverse output gear meshes with a second output gear on said second output shaft.

13. A vehicle dual clutch transmission as described in claim 12 wherein a sprocket for said second clutch housing has a larger diameter than a sprocket for said first clutch housing.

* * * * *